(12) United States Patent
Tatar et al.

(10) Patent No.: US 12,000,739 B2
(45) Date of Patent: Jun. 4, 2024

(54) LEVER BASED DIFFERENTIAL CAPACITIVE STRAIN GAUGE WITH ACCELERATION REJECTION

(71) Applicant: Analog Devices, Inc., Wilmington, MA (US)

(72) Inventors: Erdinc Tatar, Burlington, MA (US); William A. Clark, Winchester, MA (US)

(73) Assignee: Analog Devices, Inc., Wilmington, MA (US)

( * ) Notice: Subject to any disclaimer, the term of this patent is extended or adjusted under 35 U.S.C. 154(b) by 513 days.

(21) Appl. No.: 17/238,051

(22) Filed: Apr. 22, 2021

(65) Prior Publication Data

US 2022/0341795 A1 Oct. 27, 2022

(51) Int. Cl.
*G01L 1/14* (2006.01)
(52) U.S. Cl.
CPC .................................. *G01L 1/148* (2013.01)
(58) Field of Classification Search
CPC ..... G01L 1/142; G01L 1/148; B81B 2201/02; B81B 2201/0264; B81B 2201/0292
See application file for complete search history.

(56) References Cited

U.S. PATENT DOCUMENTS

| 6,606,913 | B1 * | 8/2003 | Gianchandani | .......... | G01B 7/22 |
| | | | | | 73/777 |
| 7,083,498 | B2 | 8/2006 | Jinbo et al. | | |
| 7,378,837 | B2 | 5/2008 | Andarawis et al. | | |
| 8,622,936 | B2 * | 1/2014 | Schenberger | ........ | A61B 5/0031 |
| | | | | | 600/595 |
| 9,546,917 | B2 | 1/2017 | Groden et al. | | |
| 10,203,352 | B2 | 2/2019 | Zhang et al. | | |
| 2004/0200295 | A1 * | 10/2004 | Brossia | .................. | G01N 27/20 |
| | | | | | 73/862.632 |
| 2006/0107768 | A1 | 5/2006 | Johnson et al. | | |
| 2009/0158856 | A1 * | 6/2009 | Harish | .................... | G01L 1/142 |
| | | | | | 324/660 |
| 2021/0070609 | A1 * | 3/2021 | Vesterinen | ............ | B81B 7/0016 |

FOREIGN PATENT DOCUMENTS

WO WO-2005068960 A1 * 7/2005 ............... G01B 7/22

OTHER PUBLICATIONS

Patra et al., Highly Sensitive Tunneling Accelerometer for Low Actuation Voltage Operation. IEEE Sensors 2010 Conference. 2010; 1192-7.

* cited by examiner

*Primary Examiner* — Nathaniel J Kolb
(74) *Attorney, Agent, or Firm* — Wolf, Greenfield & Sacks, P.C.

(57) ABSTRACT

Microelectromechanical systems (MEMS) capacitive strain gauge sensors are described. The strain gauge sensors include a lever configured to mechanically amplify a strain response. In some embodiments, an anchored beam is coupled to the effort arm of the lever and a movable sensing finger to the resistance arm. The effort arm may be shorter than the resistance arm, thus providing a mechanical amplification.

20 Claims, 8 Drawing Sheets

LEVER BASED DIFFERENTIAL CAPACITIVE STRAIN GAUGE WITH ACCELERATION REJECTION

FIELD OF THE DISCLOSURE

The present application relates to microelectromechanical systems (MEMS) strain gauge sensors.

BACKGROUND

Microelectromechanical systems (MEMS) inertial sensors are typically subjected to strain. The strain can impact operation of the MEMS inertial sensor. Knowledge about the strain experienced by the MEMS inertial sensor can be used to interpret signals provided by the inertial sensor.

SUMMARY OF THE DISCLOSURE

Microelectromechanical systems (MEMS) capacitive strain gauge sensors are described. The strain gauge sensors include a lever configured to mechanically amplify a strain response. In some embodiments, an anchored beam is coupled to the effort arm of the lever and a movable sensing finger to the resistance arm. The effort arm may be shorter than the resistance arm, thus providing a mechanical amplification.

Some embodiments provide a microelectromechanical systems (MEMS) strain gauge sensor, comprising: a lever configured to rotate about a fulcrum; an anchor coupled to a first end of the lever; and a movable sense finger coupled to a second end of the lever. The first end of the lever is closer to the fulcrum than the second end of the lever in at least some embodiments.

Some embodiments provide a microelectromechanical systems (MEMS) strain gauge sensor, comprising: a substrate; an anchor rigidly coupled to the substrate; an effort arm of a lever coupled to the anchor by a beam; a resistance arm of the lever coupled to a movable capacitive sense finger; and a fixed capacitive sense finger. The movable capacitive sense finger and fixed capacitive sense finger form a sensing capacitor in at least some embodiments.

Some embodiments provide a microelectromechanical systems (MEMS) capacitive strain gauge sensor, comprising: a substrate; an anchor rigidly coupled to the substrate; a lever having an effort arm and a resistance arm; a beam rigidly coupling the anchor to the effort arm; a movable capacitor electrode; and a beam rigidly coupling the movable capacitor electrode to the resistance arm of the lever.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application provide a microelectromechanical systems (MEMS) strain gauge sensor that uses a lever to provide mechanical amplification of a strain signal. The MEMS strain gauge sensor may include a lever with a shorter effort arm and a longer resistance arm. The effort arm may be coupled to an anchor of the MEMS strain gauge sensor that moves in response to strain. The movement of the anchor in response to strain induces movement of the resistance arm of the lever. A capacitive sensing element coupled to the resistance arm of the lever may provide an indication of the amount of displacement of the anchor and may displace more than the anchor displaces due to the resistance arm being longer than the effort arm. The larger displacement of the capacitive sensing element represents an amplification of the strain signal compared to the input of the anchor movement. The sensed strain signal may be used in a variety of ways, such as to account for the impact of strain on the performance of a MEMS gyroscope or other MEMS device. In some embodiments, the MEMS strain gauge sensor is differential. The use of capacitive sensing structures provides better noise performance, lower power consumption, and better linearity of the response signal compared to resistive sensors.

Figure 1A:
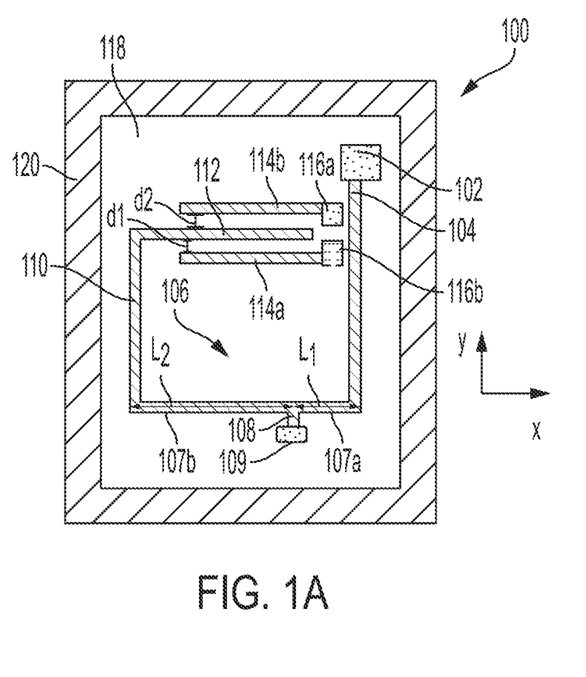
FIG. 1A is a top view of a microelectromechanical systems (MEMS) capacitive strain gauge sensor comprising a lever, according to a non-limiting embodiment of the present application.

FIG. 1A is a top view of a microelectromechanical systems (MEMS) capacitive strain gauge sensor comprising a lever according to an embodiment of the present application, and configured to provide a mechanically amplified strain signal. The capacitive strain gauge sensor 100 comprises an anchor 102, beam 104, lever 106, fulcrum 108 anchored by an anchor 109, beam 110, movable capacitive sense finger 112, and fixed capacitive sense fingers 114a, and 114b, which are anchored by anchors 116a and 116b, respectively. These components are disposed within a cavity 118 of a substrate 120.

The anchor 102 may be a pillar, post, or other suitable anchor that is rigidly attached to the substrate 120. In some embodiments, the anchor 102 extends downward in the negative z-direction, to where it couples to the substrate. If the substrate 120 is subjected to stress, such as due to different coefficients of thermal expansion of the different materials of the structures on the substrate, the anchor 102 may move relative to the substrate. More generally, when the substrate 120 experiences stress, it may deform from its initial state, for example bending or warping. That change of the substrate from its initial state may displace the components on the substrate, such as movable sense fingers, gyroscope components or accelerometer components. The anchor itself may displace from its initial state. For example, when the anchor 102 is a pillar or post, and when the substrate bends in response to experiencing stress, the anchor may tilt. The other components illustrated in FIG. 1A may be used to detect the displacement of the anchor, thus providing an indication of the stress being applied to the substrate 120.

The beam 104 couples the anchor 102 to the lever 106. The beam 104 is rigid in at least some embodiments and may have any suitable dimensions.

The lever 106 comprises an effort arm 107a and resistance arm 107b. The effort arm 107a has a length $L_1$ and the resistance arm has a length $L_2$. As will be described further below, having $L_1$ be less than $L_2$ provides for mechanical amplification of the motion of the anchor 102. For example, $L_2$ may be between 10% and 500% longer than $L_1$, meaning that in some embodiments the resistance arm may be between 10% and 500% longer than the effort arm of the lever. Such a configuration means that displacement of the effort arm translates to greater displacement of the resistance arm, and thus an amplification of the strain signal prompting displacement of the anchor 102 and, via the beam 104, the effort arm 107a. The amount of gain is given by $L_2/L_1$. In at least some embodiments, the MEMS strain gauge sensor is configured to provide mechanical amplification greater than 2. The lever 106 is coupled to and configured to rotate about the fulcrum 108. The fulcrum 108 may be anchored to the substrate, as shown by anchor 109. The anchor 109 may be a pillar, post, or other suitable anchor structure, and may extend downward in the negative z-direction in the figure, to where it couples to the substrate. In alternative embodiments, such as that described below in connection with FIG. 3, the fulcrum may couple to additional components of a MEMS capacitive strain gauge sensor that are not anchors.

The beam 110 couples together the lever 106 and the movable capacitive sense finger 112. The beam 110 is rigid in at least some embodiments and may have any suitable dimensions.

The movable capacitive sense finger 112 forms capacitors with fixed capacitive sense fingers 114a and 114b. That is, each of the movable capacitive sense finger 112, fixed capacitive sense finger 114a, and fixed capacitive sense finger 114b, may serve as a capacitor electrode or plate. Movable capacitive sense fingers may form movable capacitor electrodes, and fixed capacitive sense fingers may form fixed capacitor electrodes. Movable capacitive sense finger 112 and fixed capacitive sense finger 114a form a first capacitor and movable capacitive sense finger 112 and fixed capacitive sense finger 114b form a second capacitor. At equilibrium, a gap with a distance d1 exists between the movable capacitive sense finger 112 and the fixed capacitive sense finger 114a, and a gap with a distance d2 exists between the movable capacitive sense finger 112 and the movable capacitive sense finger 114b. As the movable capacitive sense finger 112 moves in the y-direction, the two capacitances vary in opposite directions, with one increasing in capacitance and the other decreasing in capacitance. The movable capacitive sense finger 112, and fixed capacitive sense fingers 114a and 114b may be connected to suitable signal lines to provide or receive electrical signals. For example, a voltage may be applied to anchor 102 which propagates to movable capacitive sense finger 112. Suitable voltages may be applied to or pulled from fixed capacitive sense fingers 114a and 114b. The changes in sensed capacitance are an indication of the displacement of the anchor 102 and therefore the stress experienced by the substrate 120. Knowledge of this stress may be used to account for the impact of stress on other MEMS devices on the same substrate, such as a MEMS gyroscope on the same substrate 120.

The substrate 120 may be a semiconductor substrate in some embodiments. For example, the substrate may be a silicon substrate. The cavity 118 may be formed through microfabrication techniques, such as photolithography and etching. The remaining components illustrated in FIG. 1A may therefore be formed through microfabrication etching processes, and may be released from the underlying substrate 120 with a suitable release process.

The operation of the MEMS capacitive strain gauge sensor 100 is now described. The anchor 102 may deflect. The deflection may be caused by stress. The stress may be, for example, packaging stress resulting from the packaging of the capacitive strain gauge sensor, stress resulting from aging of the materials, or from other causes. The anchor may deflect in the negative y-direction. Because the beam 104 couples to the anchor 102, the beam 104 will also move in the direction of deflection of the anchor, such as in the negative y-direction. The lever will rotate in the clockwise direction about the fulcrum 108. That rotation causes the movable capacitive sense finger 112 to move in the positive y-direction. Because the effort arm 107a is shorter than the resistance arm 107b, the movable capacitive sense finger 112 will deflect by a greater distance in the y-direction than the anchor 102 deflects in the negative y-direction. In this manner, the MEMS capacitive strain gauge sensor mechanically amplifies the strain signal. The displacement of the movable capacitive sense finger 112 is detected by changes in the capacitances that the movable capacitive sense finger 112 forms with the fixed capacitive sense finger 114a and the fixed capacitive sense finger 114b.

Figure 1B:
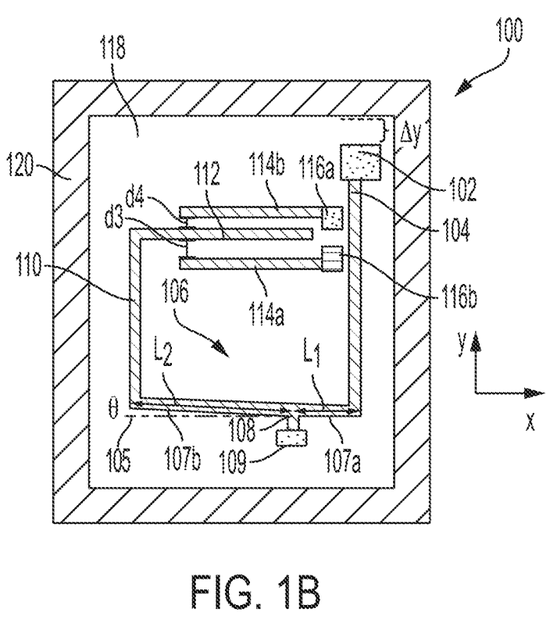
FIG. 1B is a top view of the MEMS capacitive strain gauge sensor of FIG. 1A in a state of displacement.

FIG. 1B illustrates the MEMS capacitive strain gauge sensor 100 of FIG. 1A in a state of displacement. As shown, the anchor 102 has displaced in the negative y-direction from its original position by an amount Δy. As a result, the lever 106 pivots clockwise about the fulcrum 108, such that the lever 106 forms an angle θ with the x-axis. The dashed line 105 is parallel to the x-axis, and shown for purposes of understanding the angle θ. The movable capacitive sense finger 112 displaces from its original position such that the gap between the movable capacitive sense finger 112 and the fixed capacitive sense 114a has a distance d3 greater than the d1, and such that the gap between the movable capacitive sense finger 112 and the fixed capacitive sense finger 114b has a distance d4 less than the distance d2. The difference between d1 and d3 may be greater than Δy. Likewise, the distance between d2 and d4 may be given by the negative of the difference between d1 and d3, the absolute value of which is greater than Δy. Thus, it should be appreciated that aspects of the present application provide a MEMS capacitive strain gauge sensor comprising means for mechanically amplifying the strain signal input to the strain gauge sensor.

Figure 2:
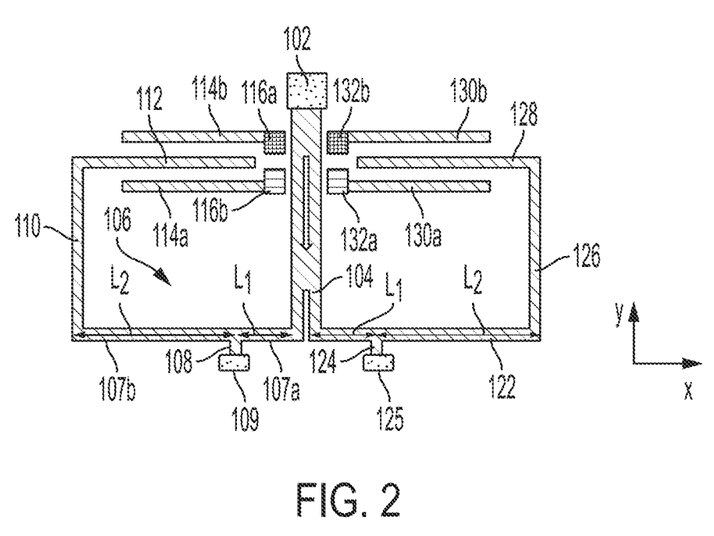
FIG. 2 is a top view of an alternative MEMS capacitive strain gauge sensor, according to a non-limiting embodiment of the present application.

FIG. 2 is a top view of an alternative MEMS capacitive strain gauge sensor, according to a non-limiting embodiment of the present application. The MEMS capacitive strain gauge sensor 200 expands upon the MEMS capacitive strain gauge sensor 100 in that it includes a second lever and a second movable capacitive sense finger. Thus, the MEMS capacitive strain gauge sensor 200 is configured to supply twice the signal that is generated by the MEMS capacitive strain gauge sensor 100 of FIGS. 1A and 1B. The MEMS capacitive strain gauge sensor 200 comprises two instances of each component except for the anchor 102 and beam 104, which are shared between two lever configurations. That is, the MEMS capacitive strain gauge sensor 200 comprises the components of MEMS capacitive strain gauge sensor 100, which are not described again in detail here, in addition to a lever 122, fulcrum 124, anchor 125, beam 126, movable capacitive sense finger 128, fixed capacitive sensor fingers 130a and 130b, and anchors 132a and 132b. Those components operate in combination in the same manner described previously in connection with the components of FIG. 1A.

According to an aspect of the present application, a differential MEMS capacitive strain gauge sensor is provided, with mechanical amplification of the strain signal. FIGS. 1A-1B and 2 illustrate single-ended MEMS capacitive strain gauge sensors. Such configurations may be satisfactory in some applications, but in other applications common mode signals may negatively impact such strain gauge sensors. A differential configuration may reduce or eliminate any common mode signal.

Figure 3:
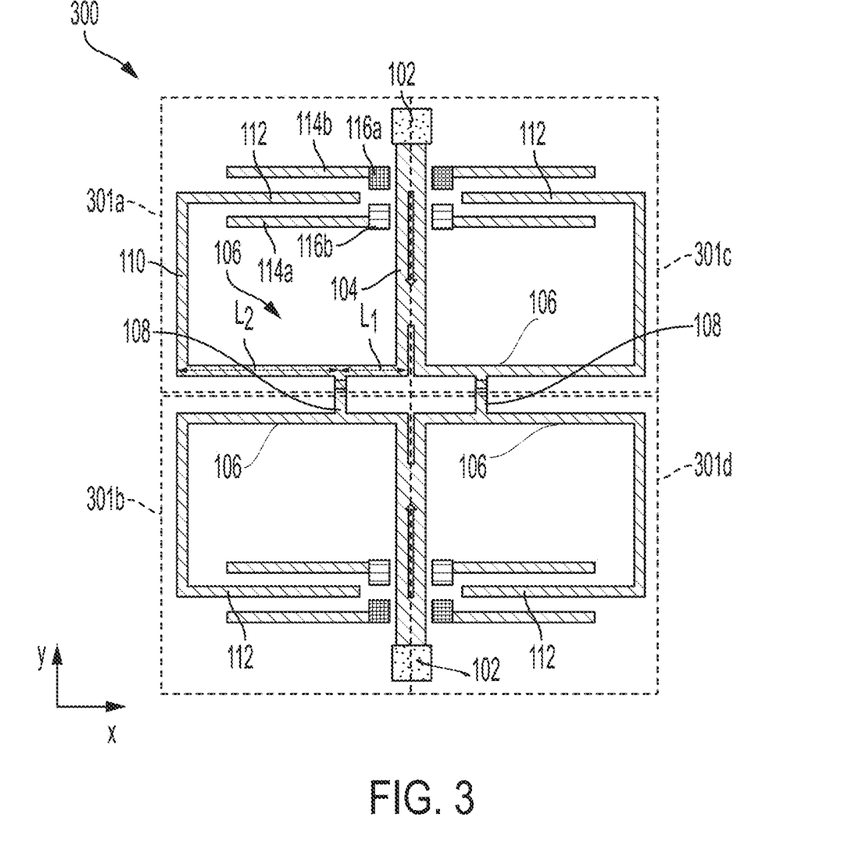
FIG. 3 is a top view of a differential MEMS capacitive strain gauge sensor, according to a non-limiting embodiment of the present application.

FIG. 3 is a top view of a differential MEMS capacitive strain gauge sensor, according to a non-limiting embodiment of the present application. The differential MEMS capacitive strain gauge sensor 300 includes four identical instances of a capacitive strain gauge sensor, labeled as 301a, 301b, 301c, and 301d. Each of the capacitive strain gauge sensors 301a-301d is substantially the same as capacitive strain gauge sensor 100 of FIG. 1A except that the fulcrum 108 is not anchored. Instead, the fulcrum 108 is shared by two occurrences of the capacitive strain gauge sensor. In the non-limiting example shown, capacitive strain gauge sensor 301a and 301b share a fulcrum 108, and capacitive strain gauge sensors 301c and 301d share a fulcrum 108. That is, differential MEMS capacitive strain gauge sensor 300 has two levers coupled to opposite ends of each fulcrum 108. More generally, according to an embodiment of the present application, a differential MEMS capacitive strain gauge sensor comprises a first lever coupled to one end of a fulcrum and a second lever coupled to a second end of the fulcrum, such that the first and second levers are coupled to opposite ends of a fulcrum.

The capacitive strain gauge sensors 301a and 301b are configured in a differential arrangement. Likewise, the capacitive strain gauge sensors 301c and 301d are configured in a differential arrangement. The differential arrangement reduces or eliminates common mode signals in the sensed capacitances between the movable capacitive sense fingers and the fixed capacitive sense fingers.

As can be seen in FIG. 3, a differential MEMS capacitive strain gauge sensor in some embodiments comprises four levers 106. Each of the levers may have a resistance arm longer than an effort arm of the lever, thus configured to provide mechanical amplification of a displacement signal of a component coupled to the effort arm. The amplification is greater than 2 in at least some embodiments. A movable capacitive sense finger 112 is coupled to the resistance arm of each lever, such that the differential MEMS capacitive strain gauge may have four movable capacitive sense fingers. An anchor 102 may be coupled to the effort arm of two of the four levers, and a second anchor may be coupled to the effort arms of the remaining two levers of the four levers.

It should be appreciated from FIG. 3, that according to at least one embodiment of the present application, a MEMS strain gauge sensor is provided, comprising at least two levers, and in some embodiments a first lever, second lever, third lever, and fourth lever, coupled to two anchors. Two or more, and in some cases four, movable sense fingers are coupled to respective levers. Two of the levers are coupled to opposite ends of a fulcrum and configured to rotate about the fulcrum in opposite directions. Movement of the two anchors may cause rotation of the four levers—two in a clockwise rotational manner and two in a counter-clockwise rotational manner—and displacement of four respective movable capacitive sense fingers. The displacement of the movable capacitive sense fingers may be detected as a change in capacitance between the movable capacitive sense fingers and corresponding fixed capacitive sense fingers. The detected changes in capacitance may be used to determine the strain applied to the differential MEMS capacitive strain gauge sensor through use of any suitable signal processing algorithm.

Figure 4:
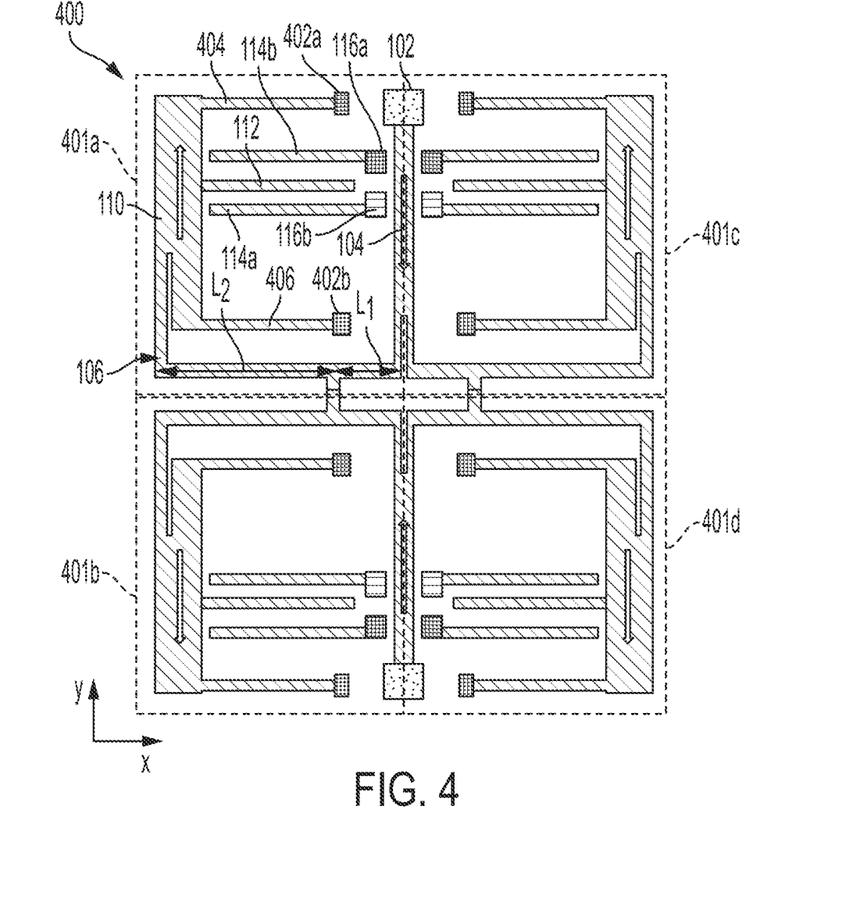
FIG. 4 is a top view of an alternative differential MEMS capacitive strain gauge sensor, according to a non-limiting embodiment of the present application.

FIG. 4 is a top view of an alternative differential MEMS capacitive strain gauge sensor, according to a non-limiting embodiment of the present application. The differential MEMS capacitive strain gauge sensor 400 differs from the differential MEMS capacitive strain gauge sensor 300 in the addition of anchors and beams configured to provide greater stability to the movable capacitive sensing fingers. The differential MEMS capacitive strain gauge sensor 400 include four identical instances of a capacitive strain gauge sensor, labeled as 401a, 401b, 401c, and 401d. Each of the capacitive strain gauge sensors 401a-401d includes several of the same components as capacitive strain gauge sensor 100 of FIG. 1A. In this sense, the differential MEMS capacitive strain gauge sensor is similar in some respects to differential MEMS capacitive strain gauge sensor 300 of FIG. 3. However, the capacitive strain gauge sensors 401a-401d each include an additional support structure comprising anchors 402a and 402b, and beams 404 and 406. The lengths of beam 104, lever 106, and beam 110 may be sufficiently long that movable capacitive sense finger 112 may not be supported as sturdily as is desirable. Including beams 404 and 406, with each of those being anchored by a respective anchor 402a and 402b, increases the support provided to the movable capacitive sense finger 112. The anchors 402a and 402b may be positioned at locations which, in combination with the shapes and dimensions of the beams 404 and 406, provide a desired level of rigidity to the structure supporting movable capacitive sense finger 112.

The MEMS capacitive strain gauge sensors illustrated in FIGS. 1A-1B and 2-4 are configured to detect strain in the y-direction. The sensing capacitances formed by the movable capacitive sense fingers in combination with the fixed capacitive sense fingers have gaps oriented along the y-direction. An x-direction capacitive strain gauge is achieved in some embodiments by using the same types of strain gauges illustrated in those figures, but rotated by 90° relative to those illustrated, such that the sensing capacitances have gaps oriented along the x-direction. A dual-axis strain gauge may include one strain gauge oriented to detect strain in the x-direction and one strain gauge oriented to detect strain in the y-direction. Both strain gauges may be disposed on the same substrate. A non-limiting example is illustrated in FIG. 6 and described in further detail below.

Figure 5:
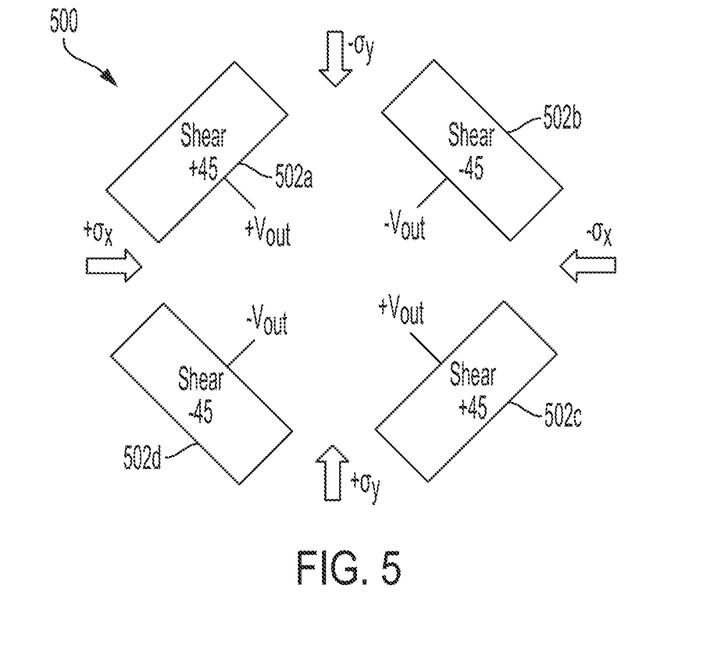
FIG. 5 illustrates a shear sensor, according to a non-limiting embodiment of the present application.

FIG. 5 illustrates a shear stress sensor, according to a non-limiting embodiment of the present application. The shear stress sensor 500 comprises four instances of a single shear stress sensor, labeled as 502a, 502b, 502c, and 502d. Each instance may be any of the MEMS capacitive strain gauges illustrated in FIGS. 1-4. They are oriented at ±45, as shown in the figure, to detect shear stress. Strain $+\sigma x$, $-\sigma x$, $+\sigma y$, and $-\sigma y$ may be applied as shown, and the resulting shear detected by the shear stress sensor 500.

According to an aspect of the present application, a multi-axis MEMS capacitive strain gauge is combined on a substrate with a MEMS inertial sensor. The MEMS capacitive strain gauge may be a single-axis, two-axis or three-axis capacitive strain gauge, by including suitable numbers and types of the MEMS capacitive strain gauges described herein. The MEMS inertial sensor may be a gyroscope or other inertial sensor. A non-limiting example is shown in FIG. 6.

Figure 6:
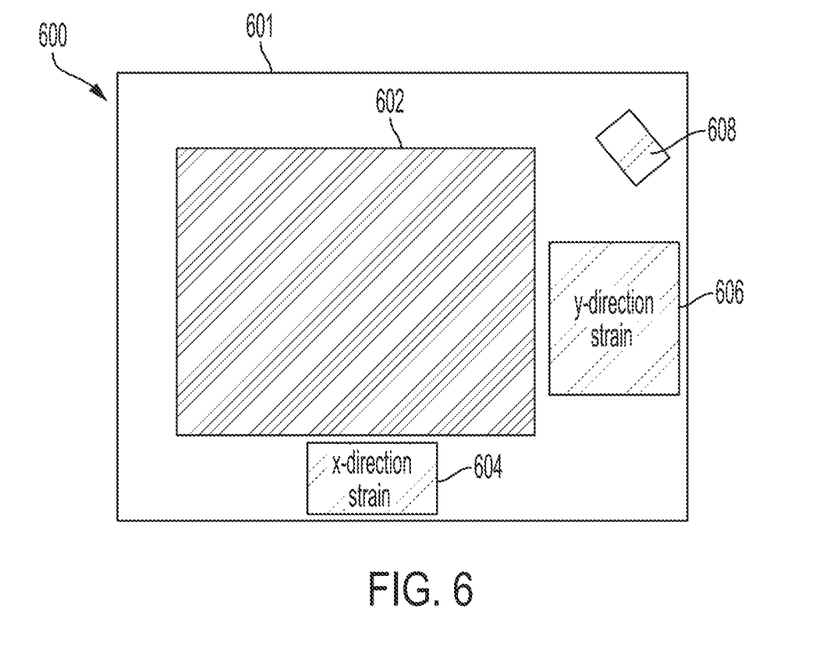
FIG. 6 is a top view of a MEMS inertial sensor and a multi-axis MEMS capacitive strain gauge, according to a non-limiting embodiment.

FIG. 6 is a top view of a MEMS inertial sensor and a multi-axis MEMS capacitive strain gauge, according to a non-limiting embodiment. The device 600 comprises a die 601 on which is formed a MEMS gyroscope 602 and three MEMS capacitive strain gauge sensors, 604, 606, and 608. The MEMS gyroscope 602 may be any suitable MEMS gyroscope, including a single-axis gyroscope, a dual-axis gyroscope, or a three-axis gyroscope. The specific details of the gyroscope are not limiting. The MEMS capacitive strain gauge sensors 604, 606, and 608 may be substantially identical, but positioned and oriented to detect strain along different axes. As shown, the MEMS capacitive strain gauge sensors 604, 606, and 608 may be positioned at different locations on the die 601. The MEMS capacitive strain gauge sensors 604, 606, and 608 may each be any of the MEMS capacitive strain gauge sensors shown in FIGS. 1-4. The MEMS capacitive strain gauge sensor 608 may be of the type illustrated in FIG. 5 for detecting shear strain.

Figure 7:
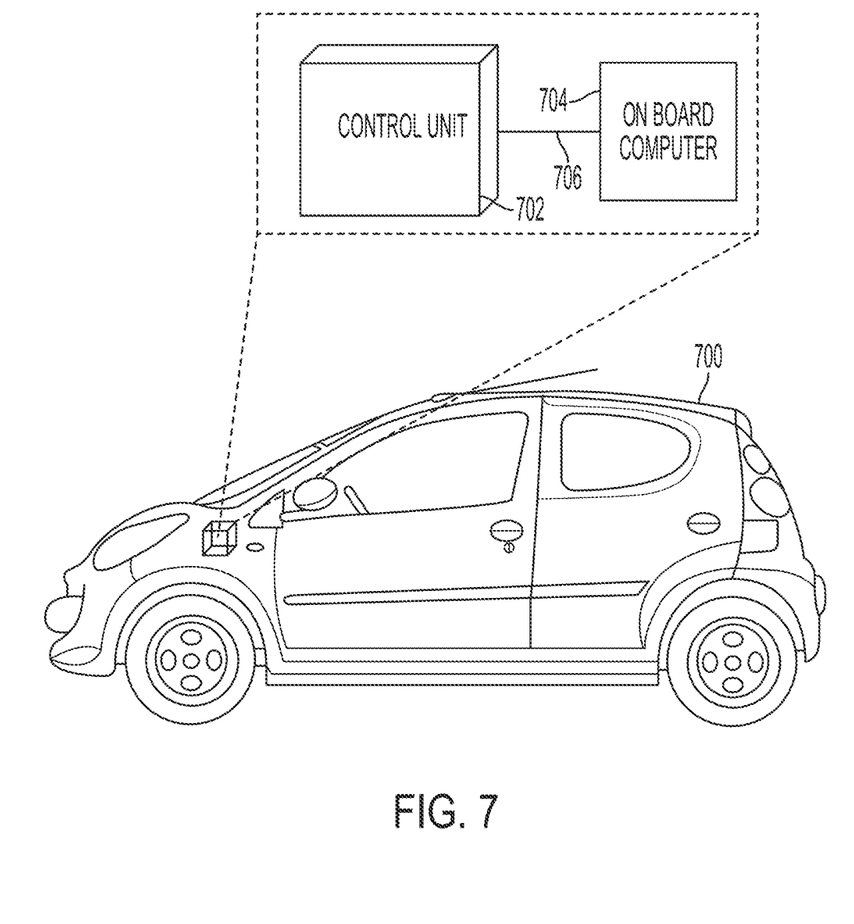
FIG. 7 illustrates an automobile which may employ MEMS devices of the types described herein, according to a non-limiting embodiment of the present application.

MEMS devices of the types described herein may be used in a variety of devices, products, and settings. One such setting is in vehicles, such as automobiles, boats, and aircraft. FIG. 7 illustrates an example in which a MEMS device of the types described herein is employed in a car. In the example of FIG. 7, an automobile 700 includes a control unit 702 coupled to an onboard computer 704 of the car by a wired or wireless connection 706. Control unit 702 may comprise a MEMS sensor or MEMS device of the types described herein, optionally together with a power source, processing circuit, interface circuitry for communicating over the connection 706, or any other suitable components. As a non-limiting example, the control unit 702 may include a MEMS gyroscope together with a MEMS capacitive strain gauge sensor of the types described herein. The MEMS gyroscope may sense yaw of the automobile 700, as an example. The control unit 702 may comprise a package or housing attached to a suitable part of the automobile 700, with the MEMS device inside. Control unit 702 may receive power and control signals from the onboard computer 704, and may supply sense signals to the onboard computer 704.

Another setting in which MEMS devices of the types described herein may be used is in sensor devices for sports applications, such as tennis, swimming, running, baseball, or hockey, among other possibilities. In some embodiments, a MEMS gyroscope may be part of a wearable fitness device. In other embodiments, the sensor may be part of a piece of sporting equipment, such as being part of a tennis racket, baseball bat, or hockey stick. Sense data from the sensor may be used to assess performance of the user. Strain data from a MEMS capacitive strain gauge sensor of the types described herein may be used to process the data provided by the gyroscope.

Aspects of the present application may provide various benefits. For example, MEMS capacitive strain gauges according to at least some embodiments of the present application—such as those illustrated in FIGS. 1A, 2, 3, and 4—may provide strain sensing while rejecting acceleration. Thus, the MEMS capacitive strain gauges described herein may be used effectively in combination with MEMS gyroscopes, where acceleration rejection may be important. According to an aspect of the present application, a MEMS gyroscope is coupled with a MEMS strain gauge of the types described herein, with the strain detected by the strain gauge being factored into output signals generated by the MEMS gyroscope, thus making the output signal(s) of the MEMS gyroscope immune, or substantially immune, to mechanical strain. The strain impacting the gyroscope may be sensed by the strain gauge without having to sense temperature. Rather, strain may be measured directly using the strain gauge. Moreover, the use of a capacitive sensor may provide lower power consumption, improved noise performance, and improved linearity compared to some alternative sensing schemes, such as resistive sensors.

Alternatives to the embodiments described are possible. For example, instead of capacitive sensing, detection using tunneling tips may be performed. For example, in the non-limiting example of FIG. 1A, movable capacitive sense finger 112 may instead be a tunneling tip, configured to move toward and away from sense fingers where fixed capacitive sense fingers 114a and 114b are illustrated. The tunneling current may be detected, thus providing an indication of the gap distance between the movable and fixed fingers.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A microelectromechanical systems (MEMS) strain gauge sensor, comprising:
a lever configured to rotate about a fulcrum;
an anchor coupled to a first end of the lever; and
a movable sense finger coupled to a second end of the lever,
wherein the first end of the lever is closer to the fulcrum than the second end of the lever.

2. The strain gauge sensor of claim 1, further comprising a fixed sense finger, wherein the movable sense finger and fixed sense finger are configured to form a capacitor.

3. The strain gauge sensor of claim 1, wherein the lever is a first lever, the anchor is a first anchor, the movable sense finger is a first movable sense finger, and wherein the strain gauge sensor further comprises a second lever, second anchor, and second movable sense finger, wherein the second lever is coupled to an opposite end of the fulcrum than the first lever and is configured to rotate about the fulcrum, wherein the second anchor is coupled to a first end of the second lever and the second movable sense finger is coupled to a second end of the second lever.

4. The strain gauge sensor of claim 3, further comprising third and fourth levers, and third and fourth movable sense fingers, wherein the first anchor is coupled to a first end of the third lever and the second anchor is coupled to a first end of the fourth lever, and wherein the third movable sense finger is coupled to a second end of the third lever and the fourth movable sense finger is coupled to a second end of the fourth lever.

5. A multi-axis strain gauge sensor comprising: at least two strain gauge sensors of claim 1, configured to detect strain in orthogonal directions relative to each other.

6. The strain gauge sensor of claim 1, sensor is configured to provide mechanical amplification greater than 2.

7. The strain gauge sensor of claim 1, further comprising anchored parallel beams capacitively coupled to the movable sense finger.

8. A microelectromechanical systems (MEMS) strain gauge sensor, comprising:
a substrate;
an anchor rigidly coupled to the substrate;

an effort arm of a lever coupled to the anchor by a beam;
a resistance arm of the lever coupled to a movable capacitive sense finger; and
a fixed capacitive sense finger, wherein the movable capacitive sense finger and fixed capacitive sense finger form a sensing capacitor.

9. The strain gauge sensor of claim 8, wherein the resistance arm of the lever is coupled to the movable capacitive sense finger by a beam.

10. The strain gauge sensor of claim 8, wherein the lever is a first lever, the anchor is a first anchor, the movable capacitive sense finger is a first movable capacitive sense finger, and wherein the strain gauge sensor further comprises a second lever, second anchor, and second movable capacitive sense finger, wherein the first and second levers are configured to rotate about a common fulcrum, and wherein the second anchor is coupled to an effort arm of the second lever and the second movable capacitive sense finger is coupled to a resistance arm of the second lever.

11. The strain gauge sensor of claim 10, further comprising third and fourth levers, and third and fourth movable capacitive sense fingers, wherein the first anchor is coupled to an effort arm of the third lever and the second anchor is coupled to an effort arm of the fourth lever, and wherein the third movable sense finger is coupled to a resistance arm of the third lever and the fourth movable sense finger is coupled to a resistance arm of the fourth lever.

12. A multi-axis strain gauge sensor comprising: at least two strain gauge sensors of claim 8, configured to detect strain in orthogonal directions relative to each other.

13. The strain gauge sensor of claim 8, wherein the resistance arm of the lever is between 10% and 500% longer than the effort arm of the lever.

14. The strain gauge sensor of claim 8, further comprising anchored parallel beams capacitively coupled to the movable capacitive sense finger.

15. A microelectromechanical systems (MEMS) capacitive strain gauge sensor, comprising:
a substrate;
an anchor rigidly coupled to the substrate;
a lever having an effort arm and a resistance arm;
a beam rigidly coupling the anchor to the effort arm;
a movable capacitor electrode; and
a beam rigidly coupling the movable capacitor electrode to the resistance arm of the lever.

16. The MEMS capacitive strain gauge sensor of claim 15, further comprising a fixed capacitor electrode configured to form a variable capacitor with the movable capacitor electrode.

17. The MEMS capacitive strain gauge sensor of claim 15, wherein the lever is a first lever, the anchor is a first anchor, the movable capacitor electrode is a first movable capacitor electrode, and wherein the MEMS capacitive strain gauge sensor further comprises a second lever, second anchor, and second movable capacitor electrode, wherein the first and second levers are configured to rotate about a same fulcrum, and wherein the second anchor is coupled to an effort arm of the second lever and the second movable capacitor electrode is coupled to a resistance arm of the second lever.

18. The MEMS capacitive strain gauge sensor of claim 17, further comprising third and fourth levers, and third and fourth movable capacitor electrodes, wherein the first anchor is coupled to an effort arm of the third lever and the second anchor is coupled to an effort arm of the fourth lever, and wherein the third movable capacitor electrode is coupled to a resistance arm of the third lever and the fourth movable capacitor electrode is coupled to a resistance arm of the fourth lever.

19. A multi-axis strain gauge sensor comprising: at least two strain gauge sensors of claim 15, configured to detect strain in orthogonal directions relative to each other.

20. The MEMS capacitive strain gauge sensor of claim 15, wherein the resistance arm of the lever is between 10% and 500% longer than the effort arm of the lever.

* * * * *